G. J. STOCK.
PRODUCTION OF IRON IN AN ELECTRIC FURNACE.
APPLICATION FILED FEB. 13, 1920.
1,338,881. Patented May 4, 1920.
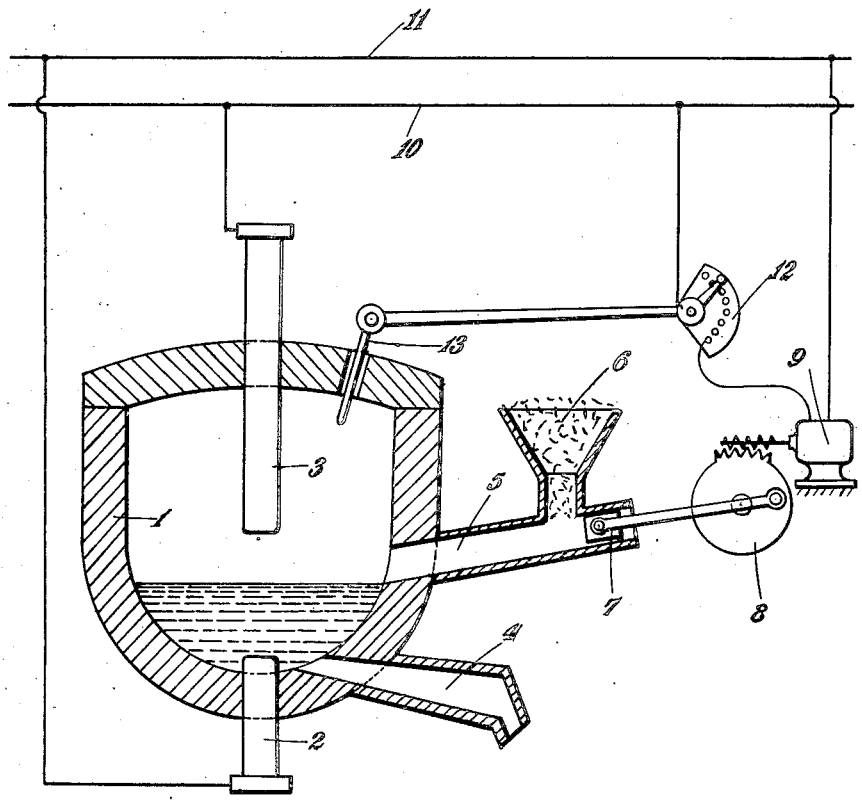

UNITED STATES PATENT OFFICE.

GUY JAMES STOCK, OF BRADFORD, ENGLAND.

PRODUCTION OF IRON IN AN ELECTRIC FURNACE.

1,338,881.   Specification of Letters Patent.   Patented May 4, 1920.

Application filed February 13, 1920. Serial No. 358,384.

*To all whom it may concern:*

Be it known that I, GUY JAMES STOCK, a subject of the King of Great Britain, residing at 24 Bank street, Bradford, in the county of York, England, have invented certain new and useful Improvements in or Relating to the Production of Iron in an Electric Furnace, of which the following is a specification.

This invention relates to the production of iron from its oxid or ore in an electric furnace and has for its chief object to control the temperature of the furnace in a manner which will enable the iron to be produced in the most efficient and economical manner.

In the reduction of iron ore in an electric furnace the absorption of the electrical energy is brought about by (1) the endothermic chemical reaction resulting in the conversion of the ore to metallic iron; and (2) the subsequent melting of the reduced metallic iron.

In working with an open electric arc it is possible to balance the input of electrical energy by the amount of oxid and carbon introduced into the furnace and according to this invention the temperature of the furnace is controlled by feeding in the ore and coke steadily at such a rate as to balance the electrical energy supplied and thus maintain the temperature substantially constant. To achieve this the furnace may be fed by automatic means which can be controlled in accordance with variations of temperature in the furnace.

When a definite quantity of material has been charged into the furnace and subjected to the action of the electric current the temperature will gradually rise until it reaches a point above that at which the reduction and melting of the iron takes place, say about 1450° C. If no further ore and carbon were added the temperature would rise until the furnace was destroyed and if the supplies of ore and carbon were maintained intermittently the absorption of the heat which is developed would occur irregularly, which would also cause dangerous increases of temperature. To avoid this the automatic feeding apparatus is controlled by a pyrometer or other temperature measurer which is so arranged that the action of the feeding apparatus is governed according to the temperature ruling in the furnace.

In order that the said invention may be clearly understood and readily carried into effect the same will now be described more fully with reference to the accompanying diagram, which shows a furnace arranged in accordance with the invention.

1 is the electric furnace equipped with a fixed bottom electrode 2 and a top electrode 3. 4 is a taphole for melted iron and 5 a feed opening for ore, which is placed a little above the surface of the slag bed. The feeding is done from a hopper or receptacle 6 which discharges into a feed channel 5 by means of a piston 7 driven by a crank wheel 8 or like device. The wheel 8 is rotated by an electric motor 9 driven by current from mains 10, 11 and the speed of the motor is regulated by means of a rheostat 12.

The rheostat 12 is connected to the pyrometer 13, which is placed in the electric furnace 1 and effects the operation of the rheostat 12 so that its resistance falls as the furnace temperature rises. If the temperature in the furnace rises above a fixed limit the rheostat resistance falls and brings about an increase in the rate of feed of the ore. If the furnace temperature falls the rate of feed decreases accordingly. In this way the temperature of the furnace can be maintained at any desired level.

The furnace so operated produces white iron and if refined white or gray iron is required the iron produced from the ore is heated in a second electrical furnace in which the carbon is regulated by the addition of fresh carbon and a suitable proportion of silicon.

What I claim and desire to secure by Letters Patent of the United States is:—

1. A process for the production of iron in an electrical furnace consisting in supplying current to melt the charge and raise it to the required temperature and in feeding the ore steadily at such a rate as to balance the electrical energy supplied and thus maintain the temperature substantially constant.

2. A process for the production of iron in an electrical furnace, consisting in supplying current to melt the charge and raise it to the required temperature and in feeding the ore steadily at a rate automatically controlled by the temperature in the furnace, so as to maintain such temperature substantially constant.

3. A process for the production of iron in an electrical furnace consisting in supplying current to melt the charge and raise it to the required temperature and in feeding the ore steadily by an electrically controlled feed the rate of which is determined by a temperature measurer so as to maintain the furnace temperature substantially constant.

4. In an electrical furnace, an ore feeding device, electrical means for operating the feed, a temperature measurer in the furnace and a regulating device for the electrical operating means under the control of the said temperature measurer, whereby the rate of feed is governed so as to maintain the furnace temperature substantially constant.

5. In an electrical furnace, an ore feeding device comprising a supply channel, an ore hopper and a reciprocating piston in the channel, an electric motor driving the piston, a regulating device for the motor, and a temperature measurer connected to the regulator, whereby the speed of the motor is regulated so as to give a rate of ore feed which maintains the furnace temperature substantially constant.

GUY JAMES STOCK.